(12) United States Patent
Thaduvayi et al.

(10) Patent No.: US 8,386,131 B2
(45) Date of Patent: Feb. 26, 2013

(54) METHOD AND SYSTEM FOR CONTROLLING A DRIVING DIRECTION OF AN ELECTRIC DRIVE MACHINE

(75) Inventors: Srikar Thaduvayi, Peoria, IL (US);
Michael D. Staub, Metamora, IL (US);
William J. Tate, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 613 days.

(21) Appl. No.: 12/509,836

(22) Filed: Jul. 27, 2009

(65) Prior Publication Data
US 2011/0022276 A1    Jan. 27, 2011

(51) Int. Cl.
G06F 19/00  (2006.01)
B60T 8/172  (2006.01)

(52) U.S. Cl. ............................................ 701/48; 701/36
(58) Field of Classification Search .............. 701/51–56, 701/36, 48; 477/34, 92
See application file for complete search history.

(56) References Cited

U.S. PATENT DOCUMENTS

| | | | |
|---|---|---|---|
| 3,831,721 A | 8/1974 | Shore | |
| 4,852,674 A | 8/1989 | Gudat | |
| 5,431,607 A | 7/1995 | Alder et al. | |
| 6,024,182 A | 2/2000 | Hamada et al. | |
| 6,246,944 B1 | 6/2001 | Maruyama | |
| 6,910,988 B2 * | 6/2005 | Carlsson | 477/92 |
| 7,267,634 B2 | 9/2007 | Nakagawa et al. | |
| 7,350,611 B2 | 4/2008 | Betz et al. | |
| 7,437,916 B2 | 10/2008 | Beach et al. | |
| 7,460,941 B2 | 12/2008 | Sychra et al. | |
| 2007/0233351 A1 | 10/2007 | Wang | |
| 2009/0203496 A1 | 8/2009 | Staub et al. | |
| 2010/0268420 A1 * | 10/2010 | Yasui et al. | 701/41 |

FOREIGN PATENT DOCUMENTS

| | | |
|---|---|---|
| JP | 07-205800 | 8/1995 |
| JP | 10-165454 | 6/1998 |
| JP | 02819621 | 8/1998 |
| JP | 2000-092601 | 3/2000 |
| JP | 2002-335602 | 11/2002 |

* cited by examiner

Primary Examiner — Yonel Beaulieu
(74) Attorney, Agent, or Firm — Leonard Stewart (57) ABSTRACT

The disclosure describes, in one aspect, a method for changing a direction of a machine that is moving in a first direction. The method includes the step of receiving a signal indicative of an intention to change the direction of the machine to a second direction. The method also includes the step of determining whether a signal indicative of a speed of the machine is greater than a threshold based at least in part on an electric motor parameter. Finally, the method includes the step of applying a braking torque to at least one travel mechanism of the machine in response to a signal indicative of an accelerator pedal position until the speed reaches the threshold.

17 Claims, 5 Drawing Sheets

METHOD AND SYSTEM FOR CONTROLLING A DRIVING DIRECTION OF AN ELECTRIC DRIVE MACHINE

TECHNICAL FIELD

This patent disclosure relates generally to electric drive machines, and more particularly to methods and systems for controlling a driving direction of an electric drive machine.

BACKGROUND

Electric drive machines may be designed to provide combinations of electric and/or internal combustion power to the machines' drivetrain. Machines increasingly use electric drive systems to provide propulsion for the machine. For example, passenger vehicles may use a hybrid drive system in which a traditional gasoline powered engine and an electric motor are both used to provide propulsion for the vehicle. Machines, such as, for example, off-highway vehicles, may use a diesel-powered engine to drive a generator, which provides electric power to an electric motor. The electric motor is typically configured to provide propulsion for the machine by driving the wheels or travel mechanisms of the machine.

In addition, braking systems may take advantage of components in electric drive systems, including the electric motor, to provide braking for machines. Electric drive machines may require the use of systems for controlling the power produced by the electric motor and/or the engine. Conventional control systems for electric drive machines use various machine operating conditions and parameters to adjust the operations of the machine's motor to increase the performance efficiency of the machine. For example, the control system may allow an operator to interface with the electric drive machine to perform various machine operations, including driving the machine in forward and reverse driving directions.

In certain situations, the operators operating the electric drive machine may desire to change the driving direction of the machine when in motion. For example, the operator may want to change the driving direction of the electric drive machine moving in reverse to forward. In some circumstances, the operator may want to change directions relatively quickly. The electric drive system, however, encounters problems when attempting to change the driving or propulsion direction of the machine if the power required to change the direction of the machine is too high. For example, attempting to change the driving direction before the power required to change the driving direction is appropriately low may lead to comparatively high currents passing through the electric drive system, which may damage some of the electric drive components. To overcome this problem, the operator may have to engage the brake system, for example, by depressing a service brake pedal, wait for the machine to stop, then engage an accelerator pedal while releasing the service brake pedal.

There are prior art systems that include control systems for controlling a method to reverse the driving direction of a vehicle in motion. One such system is described in U.S. Pat. No. 6,910,988 to Carlsson (hereinafter, "Carlsson"), which discloses a method and apparatus for reversing the driving direction of a vehicle in motion. Carlsson's system, however, which is essentially a mechanical drive system, does not address the problems encountered when attempting to change the driving direction of the electric drive machine before the power required to change the driving direction of the machine is appropriately low.

The methods and systems consistent with the disclosed embodiments are directed to overcoming one or more of the problems set forth above and/or other problems in the art.

SUMMARY

The disclosure describes, in one aspect, a method for changing a direction of a machine that is moving in a first direction. The method includes the step of receiving a signal indicative of an intention to change the direction of the machine to a second direction. The method also includes the step of determining whether a signal indicative of a speed of the machine is greater than a threshold based at least in part on an electric motor parameter. Finally, the method includes the step of applying a braking torque to at least one travel mechanism of the machine in response to a signal indicative of an accelerator pedal position until the speed reaches the threshold.

In another aspect, the disclosure describes a system for changing a direction of a machine that is moving in a first direction. The system includes a control system that is configured to receive a signal indicative of an intention to change the direction of the machine to a second direction, to determine whether a signal indicative of a speed of the machine is greater than a threshold based at least in part on an electric motor parameter, and to apply a braking torque to at least one travel mechanism of the machine in response to a signal indicative of an accelerator pedal position until the speed reaches the threshold.

DETAILED DESCRIPTION

This disclosure relates to systems and methods for controlling a driving direction of an electric drive machine. An exemplary embodiment of a machine 100 is shown schematically in FIG. 1. The machine 100 may be an off-highway truck, as shown, or any other vehicle that has an electric drive system, including passenger vehicles, trains, earthmoving machines, and mining vehicles. In an illustrated embodiment, the machine 100 includes an electric drive system 102 operatively coupled to travel mechanisms 104 to propel movement of the machine 100. The travel mechanism 104 may include wheels and axles on each side of the machine 100. In the illustrated embodiment, the travel mechanisms 104 include a set of front wheels on each side of the machine 100 and a set of rear dual wheels on each side of the machine 100. The travel mechanisms 104 allow the machine 100 to travel on the surface of a type of terrain, such as earth surface terrain.

Figure 1:
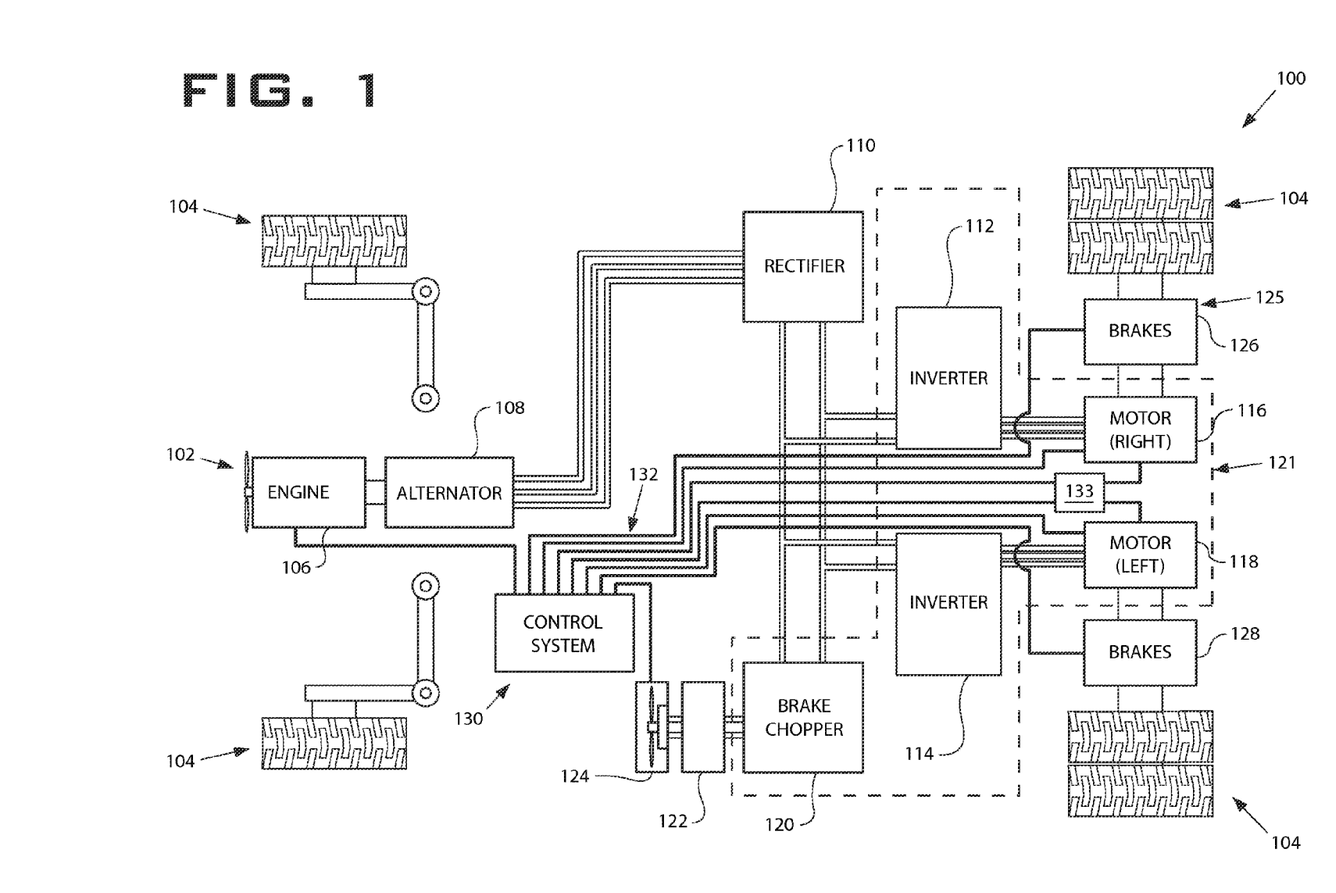
FIG. 1 schematically illustrates an electric drive machine having a control system in accordance with an exemplary embodiment of the present disclosure.

The electric drive system 102 includes an engine 106, alternator 108, rectifier 110, inverters 112, 114, and motors 116, 118. The engine 106 may provide power for the machine 100 and other machine components. Suitable engines may include gasoline powered and diesel powered engines. In one embodiment, the engine 106 may be a diesel engine that generates and transfers power to other components of the machine 100 through a power transfer mechanism, for example, a shaft (not shown). In the illustrated embodiment, the engine 106 provides power to the alternator 108. The alternator 108 generates a three-phase alternating current, which produces electrical power.

In some embodiments, the rectifier of the electric drive system 102 may convert the three-phase alternating current to a direct current. One or more of the inverters 112, 114 convert the direct current to alternating current to power one or more of the electric motors 116, 118. The electric motors 116, 118 represent motors that transfer the electric power received from the alternator 108 into power that drives one or more of the travel mechanisms 104. For example, in one embodiment, the motors 116, 118 may be wheel motors used to drive a wheel or wheels to propel the machine 100. A speed of the motors 116, 118 may be controlled by controlling the frequency of the alternating current produced by the inverters 112, 114.

In some embodiments, a single motor drives all of the travel mechanisms 104, while in some embodiments, a plurality of motors drives the travel mechanisms 104. In the illustrated embodiment, for example, an electric motor is associated with each travel mechanism 104, a right motor 116 and a left motor 118. In some embodiments, the engine 106 may be used to power some of the plurality of motors, while a separate electric power source or power storage unit such as a battery (not shown) may be used to power the remaining of the plurality of motors. In some embodiments, the motors 116, 118 may be driven directly from the separate electric power source.

The engine 106, alternator 108, rectifier 110, inverters 112, 114, and motors 116, 118 may be operatively coupled to provide power sufficient to propel the machine 100 in a forward or a reverse driving direction during a driving phase of operation. When operating the machine 100 in the driving phase, the motors 116, 118 provide a propel torque sufficient to propel the machine 100 in the forward or the reverse driving directions. In some embodiments, the electric drive system 102 may include a final drive (not shown), which includes a planetary gear set connected between the motors 116, 118 and the travel mechanisms 104 to convert the speed of the motors 116, 118 into the appropriate magnitude of the propel torque to propel the machine 100 in the forward or reverse driving directions.

Further, the electric drive system 102 may dissipate power sufficiently to retard or provide braking to the machine 100 during a retarding phase of operation. During the retarding phase of operation, the inverters 112, 114, motors 116, 118, and a braking chopper 120, collectively define an electric retarding system 121. When operating the machine 100 in the retarding phase, the motors 116, 118 may provide braking torque sufficient to cause the machine 100 to slow down. In one embodiment, the motors 116, 118 during retarding may generate alternating current that is converted to direct current by the inverters 112, 114 and that flows through the brake chopper 120, which provides direct current to direct current conversion, and into a braking grid 122. In one embodiment, electric power that is generated by the motors 116, 118 during retarding may be dissipated through the braking grid 122, preferably a conventional resistor grid, as heat energy. In the illustrated embodiment, the power that is generated by the motors 116, 118 during retarding may be used to power a fan 124 or other appropriate cooling system to reduce a temperature resulting from the heat energy radiating from the braking grid 122.

In one embodiment, the machine 100 may also include a braking system 125 that includes one or more service brakes for retarding or braking the movement of the machine 100. In some embodiments, the one or more service brakes may be associated with corresponding travel mechanisms 104. In the illustrated embodiment, the braking system 125 includes the electric retarding system 121 and a right service brake 126 and a left service brake 128. The service brakes 126, 128 may be hydraulic friction or hydro-mechanical brakes.

In one embodiment, all of the braking required to reduce a speed of the machine 100 is provided by the electric retarding system 121. In another embodiment, all of the braking required to reduce a speed of the machine 100 may be provided by the service brakes 126, 128. In the illustrated embodiment, if the electric retarding system 121 is not capable of providing all of the braking required, a portion of the braking required to reduce the speed of the machine 100 is provided by the electric retarding system 121 and a portion of the braking required to reduce the speed of the machine 100 is provided by the service brakes 126, 128.

The service brakes 126, 128 may be manually actuated by an operator, which also allows the operator to manually control the speed of the machine 100. In some embodiments, the service brakes 126, 128 may be mechanically, electro-mechanically, hydraulically, pneumatically, or actuated by other known methods. In other embodiments, the braking system 125 may include brake solenoid valves (not shown), for example, auto-retarder front and rear brake valves, for controlling the pressure of hydraulic fluid to the service brakes 126, 128. Solenoid currents are determined based on pressures needed to provide the braking torque. In the illustrated embodiment, the service brakes 126, 128 may be automatically actuated by a control system 130. In some embodiments, the control system 130 may determine an appropriate ratio of torque splits between, for example, the left and right set of dual wheels, or between the rear wheels and the front wheels. The appropriate ratio of torque splits may be based on the relative weight at each wheel or at each set of wheels.

In the illustrated embodiment, the control system 130 may be in communication with the electric drive system 102 through a data link interface 132. In some embodiments, the control system 130 sends one or more commands to one or more components of the machine 100 for controlling the operations of the one or more components. For example, the control system 130 may send a command to the one or more components in response to signals collected and transmitted from one or more sensors. The control system 130 may receive sensor signals directly from the one or more sensors or indirectly from the data link interface 132. In the illustrated embodiment, the one or more sensors include one or more speed sensors 133 that may measure, collect, and transmit signals to the control system 130 indicative of the speed of the machine 100.

The speed sensors 133 may send speed signals to the control system 130 in response to requests, or the speed sensors 133 may be configured to send speed signals periodically, or in response to a machine event, such as increase in speed, or a deceleration, and other such events. In one embodiment, the speed sensors 133 may measure a rotational speed of an axle used in the travel mechanisms 104 that is associated with a ground speed (or linear tire speed) of the machine 100. In other embodiments the speed sensors 133 may be capable of measuring an actual ground speed of the machine 100. In one embodiment, the rotational speed is indicative of the speed of the motor (or motor RPM). A range of the speed or the motor may be from −4500 RPM to +4500 RPM. The rotational speed may also be representative of a rotating machine RPM. In some embodiments, the speed sensors 133 may be capable of sensing the direction of rotating components associated with the motors 116, 118. For example, the speed sensors 133 may include one or more hall effect sensors (not shown). In some embodiments, the one or more hall effect sensors are associated with each of the right motor 116 and the left motor 118.

Figure 2:
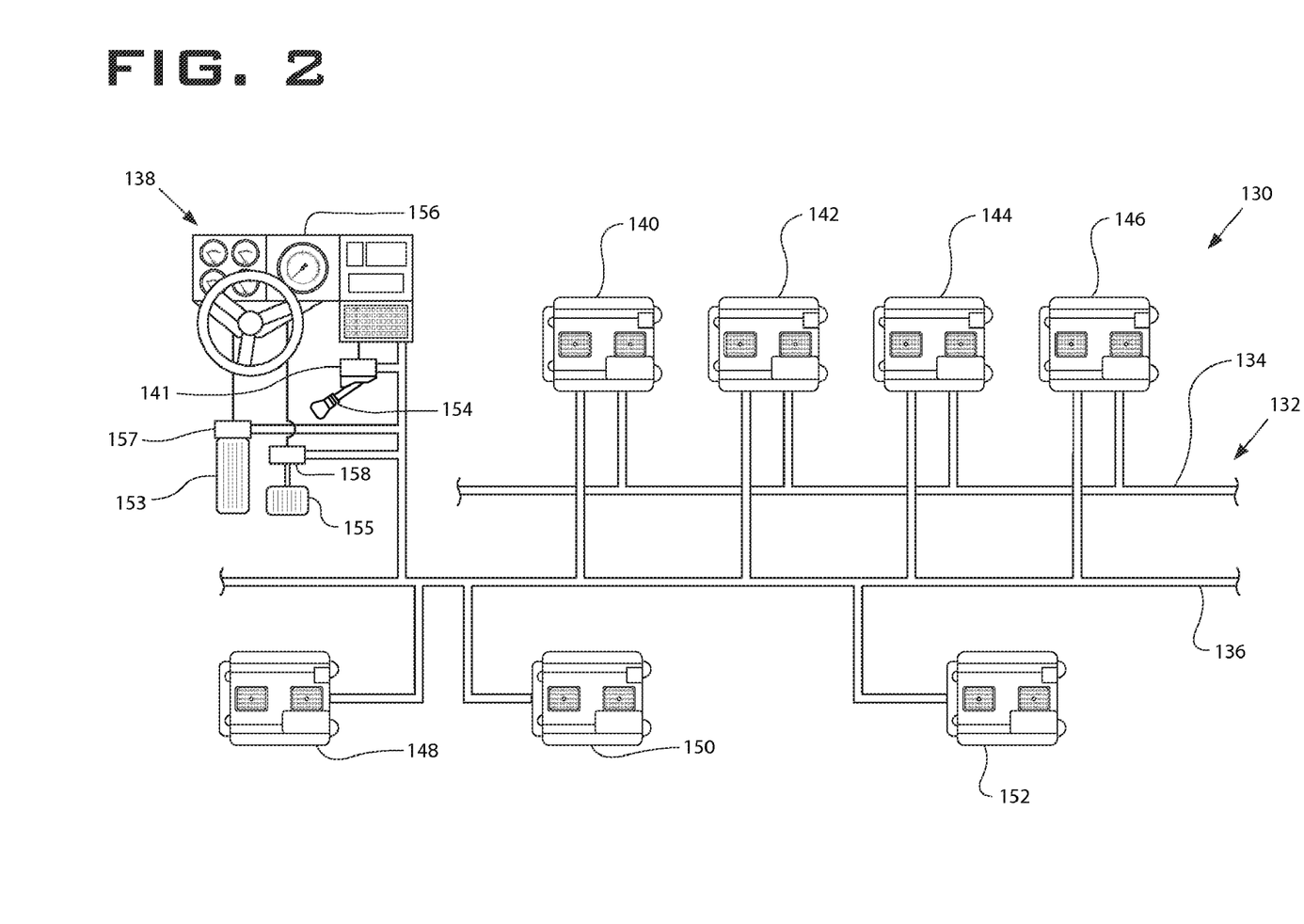
FIG. 2 schematically illustrates a control system of an electric drive machine in accordance with an exemplary embodiment of the present disclosure.

The control system 130, which may be configured to perform certain control functions with certain embodiments, is schematically illustrated in FIG. 2. In the illustrated embodiment, as shown in FIG. 1, the control system 130 is operatively connected to the electric drive system 102 through the data link interface 132. The data link interface 132 may represent one or more interface devices that interconnect one or more data links with the control system 130. The data link interface 132 may connect to proprietary or non-proprietary data links. In the illustrated embodiment, the data link interface 132 includes at least a Controller Area Network (CAN) data link 134 and a Society of Automotive Engineers (SAE) J1939 data link 136. It is contemplated that the data link interface 132 may include other standard data links and may be configured in a manner different from the illustrated embodiment without departing from the teachings of this disclosure.

In one embodiment, the control system 130 may include one or more controllers. As shown in FIG. 2, the control system 130 includes an operator interface 138, a drivetrain controller 140, motor controllers 142, 144, a grid controller 146, an engine controller 148, a chassis controller 150, and a brake controller 152. In one embodiment, the operator interface 138 includes an accelerator pedal 153, a shift lever 154, a retarder lever 155, and a display 156 for communicating information and commands between the operator and the control system 130. In one embodiment, the electric drive system 102 may include an accelerator pedal position sensor 157 that is associated with the accelerator pedal 153, which is used to determine a requested engine speed that corresponds to a desired motor power. In some embodiments, a desired motor power may correspond with a depression of the accelerator pedal 153.

The accelerator pedal position sensor 157 may be associated with a signal indicative of an accelerator pedal position that represents a percentage depression of the accelerator pedal 153 ranging from zero percent (0%) to 100 percent (100%), in which zero percent (0%) depression is a released position representing no acceleration and 100 percent (100%) is a full accelerator pedal position representing maximum acceleration. The accelerator pedal position signal may be transmitted from the accelerator pedal position sensor 157 to the other components of the control system 130 to indicate an amount of torque requested by the operator. The accelerator pedal position signal representative of the released position means no torque is requested. The accelerator pedal position signal representative of the full accelerator pedal position means the maximum amount of torque allowed to be applied to the machine 100 is requested given current operating conditions. The accelerator pedal position signal representative of a percentage depression that is between zero percent (0%) and 100 percent (100%) means the operator is requesting a non-zero torque that is less than the maximum amount of torque allowed.

In one embodiment, each of the controllers 140, 142, 144, 146, 148, 150, 152 may include one or more control modules (e.g. ECMs, ECUs, etc.). The one or more control modules may include processing units, memory, sensor interfaces, and/or control signal interfaces (for receiving and transmitting signals). The processing unit may represent one or more logic and/or processing components used by the control system 130 to perform certain communications, control, and/or diagnostic functions. For example, the processing unit may be configured to execute routing information among devices within and/or external to the control system 130.

Further, the processing unit may be configured to execute instructions from a storage device, such as memory. The one or more control modules may include a plurality of processing units, such as one or more general purpose processing units and or special purpose units (for example, ASICS, FPGAs, etc.). In certain embodiments, functionality of the processing unit may be embodied within an integrated microprocessor or microcontroller, including integrated CPU, memory, and one or more peripherals. The memory may represent one or more known systems capable of storing information, including, but not limited to, a random access memory (RAM), a read-only memory (ROM), magnetic and optical storage devices, disks, programmable, erasable components such as erasable programmable read-only memory (EPROM, EEPROM, etc.), and nonvolatile memory such as flash memory.

In the illustrated embodiment, the drivetrain controller 140 is a supervisor controller. As the supervisor controller, the drivetrain controller 140 may act as a high-level controller for the electric drive system 102 and may interface between the electric drive system 102 and the control system 130. In one embodiment, as the supervisor controller, a signal transmitted from the drivetrain controller 140 may have priority over a signal transmitted by any of other controllers 142, 144, 146, 148, 150, 152 in the control system 130, for example, even if the signals from the drivetrain controller 140 and the other controllers 142, 144, 146, 148, 150, 152 are representative of a same command or indicative of a same event. It is contemplated, however, that any of the other controllers 142, 144, 146, 148, 150, 152 may act as the supervisor controller and thus may interface between the electric drive system 102 and the control system 130 in the same way as is described for the drivetrain controller 140. In other words, all of the disclosed commands, functions, and operations, for example, that are attributed to the drivetrain controller 140 may also be attributed to any of the other controllers 142, 144, 146, 148, 150, 152 described herein.

The drivetrain controller 140 may control the electric drive system 102 to produce a desired propulsion of the machine 100 in the forward or the reverse driving directions. The drivetrain controller 140 manages torque commands for the motors 116, 118 by taking into account a number of factors, such as operator requests, current machine speed, engine power availability, machine speed limits, and environment factors, including drivetrain and component temperatures. The drivetrain controller 140 determines a desired torque to transmit to the motors 116, 118 based on one or more of a requested gear command signal, the accelerator pedal position signal, a retarder lever position signal, a payload status, and/or speed limits.

In one embodiment, the drivetrain controller 140 receives signals from the accelerator pedal 153 and the retarder lever 155 of the operator interface 138 and receives the requested gear command signal from the chassis controller 150, which is described in more detail below. The requested gear command signal may represent such gear selections as park, reverse, neutral, drive, or low. The drivetrain controller 140 may enforce speed limits for various machine conditions as requested by the chassis controller 150 and the brake controller 152. Examples of speed limits include machine speed limit, loaded speed limit, body-up speed limit, final drive oil temperature speed limit, and overloaded speed limit.

While in the driving phase, the machine 100 may change direction while traveling in the forward or the reverse driving directions. The machine 100 may detect a desired direction shift based on operator inputs associated with the driving direction of the machine 100. For example, if the operator changes the direction of the machine 100 through operator input (e.g. forward or reverse direction mechanisms in a cab of the machine 100), one or more signals indicative of this direction shift may be provided to the control system 130, for example, to the drivetrain controller 140. In the illustrated embodiment, the operator engages a shift lever 154 to control the driving direction of the machine 100. The shift lever 154 includes at least a drive and a reverse position associated respectively with the forward and reverse driving directions of the machine 100. The operator interface 138 further includes a shift lever position sensor 141 associated with the shift lever 154 to detect an operator's intention to change from one of a position of the shift lever 154 to another one of the position of the shift lever 154.

In some embodiments, the shift lever position sensor 141 may also detect shifts in the driving direction of the machine 100 through various components, such as, for example, the engine 106, the motors 116, 118, and/or the travel mechanisms 104. The shift lever position sensor 141 may be configured to send the one or more direction shift signals to the control system 130 directly or indirectly. Alternatively, or additionally, the shift lever position sensor 141 may send the one or more direction shift signals to the control system 130 for subsequent processing. Accordingly, the machine 100 may change directions from a first driving direction, for example, from the reverse driving direction, to a second driving direction, for example, to the forward driving direction, in response to the one or more direction shift signals.

While in the retarding phase, the drivetrain controller 140 may control the electric drive system 102 to retard the machine 100 and thus reduce the speed of the machine 100 to a desired speed, or to stop the machine 100 completely. The drivetrain controller 140 commands the braking system 125 to provide a requested desired machine retarding torque. The requested desired machine retarding torque is a total amount of desired torque, for example, from the axles of all wheels on the machine 100, needed to regulate the machine speed. In one embodiment, the drivetrain controller 140 calculates the requested desired machine retarding torque to be applied to the machine 100 based in part on such inputs as the retarder lever position signal, motor speeds, and speed limits that are preconfigured, operator controlled, or based on operating conditions. The retarder lever position signal may be transmitted from a retarder sensor 158 to the control system 130 to indicate a percentage travel of the retarder lever 155 ranging from zero percent (0%) to 100 percent (100%), in which zero percent (0%) means no retarding and 100 percent (100%) means maximum retarding.

In some embodiments, the requested desired machine retarding torque or the total amount of desired torque may be based on signals received by the drivetrain controller 140 from the brake controller 152. The signals received from the brake controller 152 may be indicative of various retarder parameters including a manual retarder torque setting, which allows the operator to control machine speed, and an automatic retarder speed setting, which automatically sets the desired machine retarding torque to control machine speed. The automatic retarder speed setting may be programmed in advance or may be set by the operator before or during operation of the machine 100.

The drivetrain controller 140 may also determine a requested electric retarding torque, which is also referred to as a motor requested torque, to be applied to the machine 100 based on the capacity of the electric drive system 102 to sufficiently provide the requested desired machine retarding torque. The motor requested torque represents a request for a limited amount of retarding torque transmitted to the motor controllers 142, 144 based on their respective motor specifications. While in the retarding phase, in some embodiments, the drivetrain controller 140 may also control the fan 124, which is hydraulically-driven to provide air that cools the drivetrain components and other machine components, for example, such as the braking grid 122. In the illustrated embodiment, the grid blower controller 146 controls the fan 124 for cooling the drivetrain and machine components.

The motor controllers 142, 144 are responsible for producing motor torques that propel the machine 100. In one embodiment, the motor torques may be produced as a result of high-speed power switching. In the illustrated embodiment, each of the motor controllers 142, 144 is associated with at least one travel mechanism 104. In the illustrated embodiment, two motor controllers 142, 144 are each associated with each set of the rear dual wheels. The motor controllers 142, 144 may receive a motor torque request from the drivetrain controller 140 and may receive other suitable information to control the motor torques, and further, to develop switching commands, including, for example, frequency, phase, voltage, and pulse width modulation mode.

The engine controller 148 may be configured to perform standard engine control functions for the machine 100. The engine controller 148 may be configured to initiate and perform one or more engine control processes. In the illustrated embodiment, the engine controller 148 regulates engine speed and provides power to the machine 100. The engine controller 148 provides propulsion power and may support retarding power in a few operating conditions. In one embodiment, the one or more speed sensors may include an engine speed sensor (not shown) associated with the engine controller 148. The engine speed sensor may be a passive magnetic pickup sensor, which measures engine speed from an engine flywheel sensor port. A measurable range of the engine speed may be 300 to 2800 RPM.

The chassis controller 150 receives the shift lever position signal, conditions the shift lever position signal, and outputs the requested gear command corresponding to the shift lever position signal, as discussed above. The shift lever position signals representative of positions of the shift lever 154 include park, reverse, neutral, drive, and low, which each respectively corresponds to the requested gear command. In one embodiment, the chassis controller 150 facilitates a reverse neutralizing function while dumping a load. The chassis controller 150 receives a signal indicative of a hoist lever position, either a raise position signal or a lower position signal, and provides a neutral gear command signal when the hoist lever position is raise or lower.

In the illustrated embodiment, the brake controller 152 determines whether the motor requested torque to be provided by the electric retarding system 121 is sufficient to provide the total amount of desired torque based on the requested desired machine retarding torque and the motor requested torque. If the electric retarding system 121 cannot sufficiently provide the total amount of desired torque, that is, if additional braking is necessary to attain the requested desired machine retarding torque, the brake controller 152 requests the difference between the requested desired machine retarding torque and the motor requested torque to be applied by the service brakes 126, 128. Accordingly, the brake controller 152 modulates the service brakes to provide the additional braking torque necessary to attain the requested desired machine retarding torque.

Industrial Applicability

The industrial applicably of the methods and systems for controlling a driving direction of an electric drive machine described herein will be readily appreciated from the foregoing discussion. Although the machine is shown as an off-highway truck, the machine may be any type of machine that performs at least one operation associated with, for example, mining, construction, and other industrial applications. The machine may also be a machine for use in non-industrial environments, for example, cranes, earthmoving vehicles, backhoes, and/or material handling equipment. Moreover, the methods and systems described herein can be adapted to a large variety of machines and tasks. For example, backhoe loaders, compactors, feller bunchers, forest machines, industrial loaders, paving machines, skid steer loaders, wheel loaders, track-type tractors, and many other machines can benefit from the methods and systems described. Thus, the present disclosure is applicable to many machines and in many environments.

As discussed, one exemplary machine 100 suited to the disclosure is an off-highway truck, such as a dump truck. Exemplary off-highway trucks are commonly used in mines, construction sites, and quarries. The trucks operate in a variety of environments and often must be able to change directions, for example, from the reverse driving direction to the forward direction, and sometimes in a relatively short period of time. In accordance with certain embodiments, the operator of the machine 100 may want to immediately transition from the reverse driving direction to the forward driving direction during the course of operation.

Figure 3:
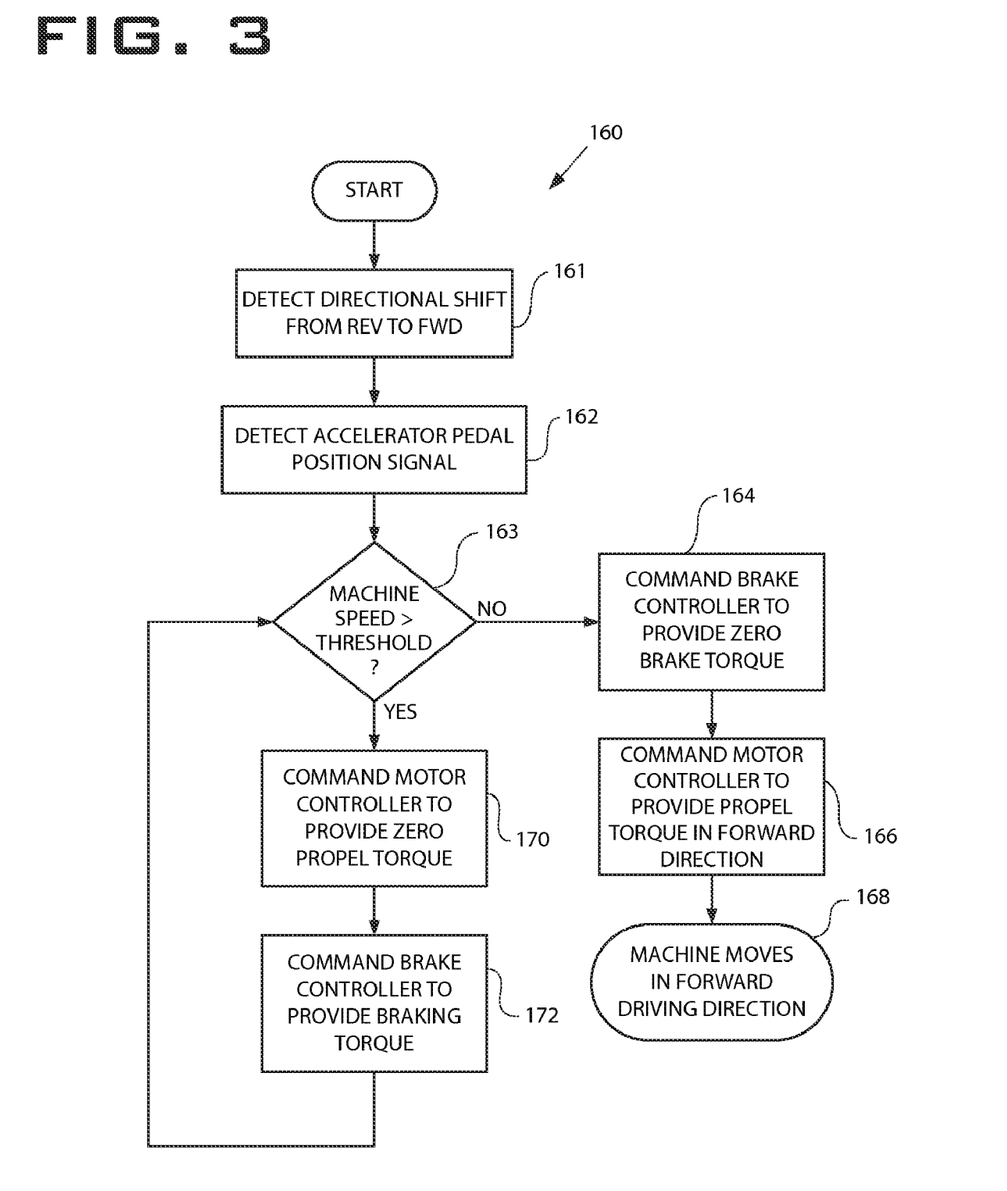
FIG. 3 is a flow chart illustrating one embodiment of a change the direction process in accordance with an exemplary embodiment of the present disclosure.

FIG. 3 illustrates a flow chart of an exemplary embodiment of a direction change process 160 that may be performed by the control system 130 and/or other components of the machine 100. As mentioned above, the machine 100 can change driving directions in response to an operator's input. Accordingly, in the illustrated embodiment, the control system 130 may be configured to detect when the machine 100 experiences a direction shift from the reverse driving direction to the forward driving direction (Step 161). To detect such a change, the drivetrain controller 140 may receive a direction shift signal from the shift lever position sensor 141 indicating a change in the shift lever position from the reverse position to the drive position.

Alternatively, the drivetrain controller 140 may receive the direction shift signal indicative of the drive position over the data link interface 132 from the chassis controller 150, which receives the shift lever position signal from the shift lever position sensor 141 and transmits the requested gear command corresponding to the shift lever position associated with the drive position to the drivetrain controller 140. The above examples are not intended to be limiting and other methods of detecting when the machine 100 has experienced a direction shift may be implemented without deviating from these teachings.

The drivetrain controller 140 also receives the accelerator pedal position signal, for example, a signal indicative of the non-zero accelerator pedal position or the full accelerator pedal position (Step 162). Once the drivetrain controller 140 receives the direction shift signal and the accelerator pedal position signal, the control system 130 may execute a direction change software implemented program. In one embodiment, the control system 130 may determine the speed of the machine 100 through the speed sensors 133. Once the machine speed is determined, the control system 130 may compare the machine speed to a threshold (Step 163). The threshold may be predetermined. Note that when comparing the machine speed to the threshold, consideration of the machine speed relative to the threshold is based on a magnitude of the machine speed not a direction of the machine speed.

Figure 4:
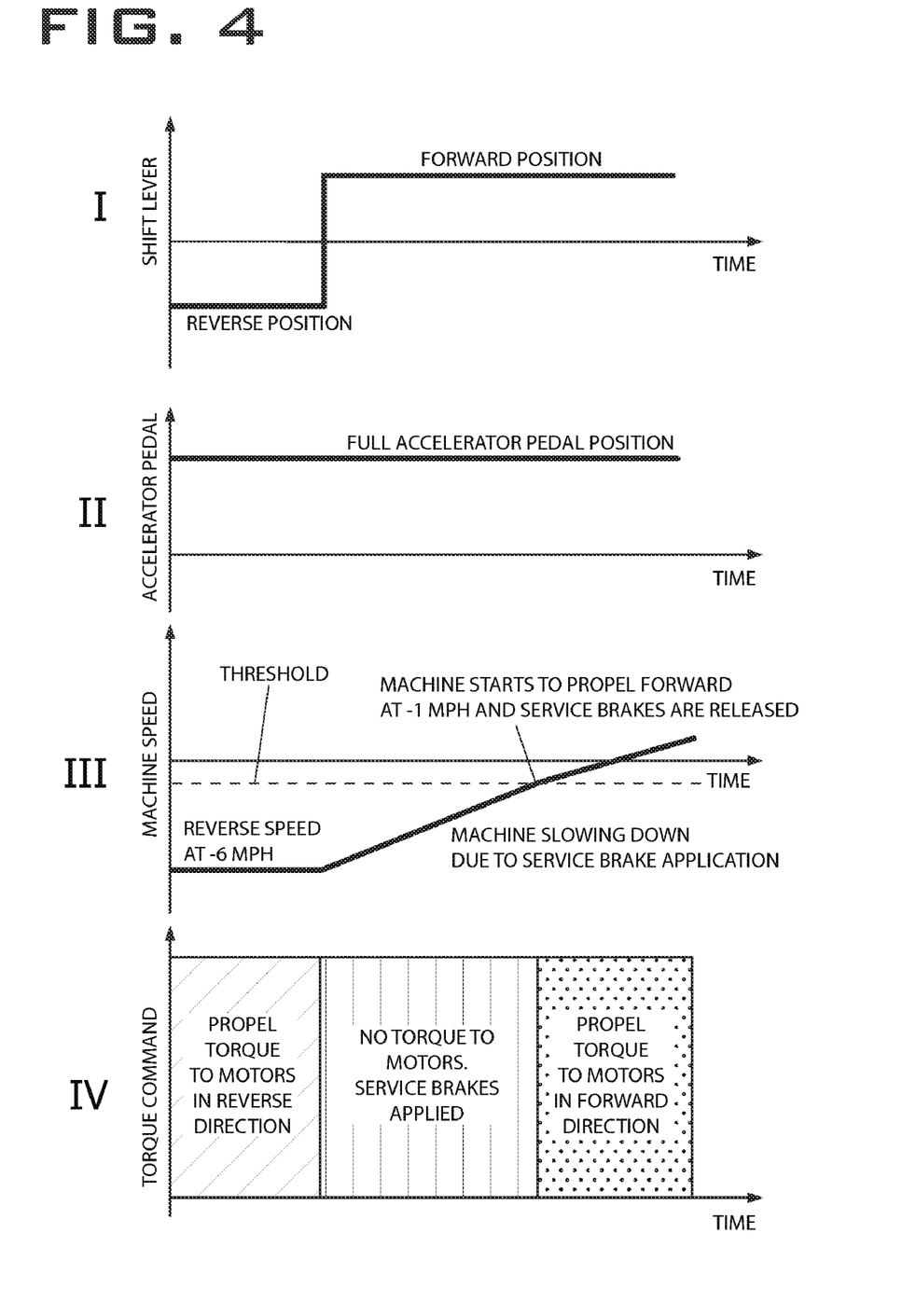
FIG. 4 is a series of four graphs illustrating various control operations as a function of time for a method for changing the driving direction of the electric drive machine in accordance with an exemplary embodiment of the present disclosure.

In one embodiment, the threshold may be based on an electric motor parameter, such as, for example, the motor speed. In one embodiment, the threshold may be based on a ground speed threshold. The ground speed threshold may be determined based on the motor speed in addition to other known methods of determining ground speed. In the illustrated embodiment, the threshold is a ground speed value that is approximately zero. In some embodiments, the threshold may be a range, for example, the ground speed threshold may be a range from approximately one mile per hour to approximately zero miles per hour, as shown in FIG. 4. The threshold value or range, nevertheless, will be any suitable value or range that represents, for example, an appropriate ground speed or motor speed for providing the travel mechanisms 104 the amount of motor torque necessary and sufficient to propel the machine 100 in the forward driving direction without causing an over-current situation in the electric drive system 102.

If the machine speed, for example, is equal to a ground speed that is approximately zero at decision point 163 of FIG. 3 (Step 163; NO), the drivetrain controller 140 commands the brake controller 152 to provide zero braking torque (Step 164). In addition, the drivetrain controller 140 commands the motor controllers 142, 144 to provide propel torque to the travel mechanisms 104 in the forward direction (Step 166) to propel the machine 100 in the forward driving direction (Step 168).

If, however, the drivetrain controller 140 determines that the machine speed is greater than the threshold, that is, for example, the machine speed is equal to a ground speed that is greater than approximately zero at decision point 163 (Step 163: YES), the drivetrain controller 140 commands the motor controllers 142, 144 to provide zero propel torque in the forward direction (Step 170), which prevents the machine 100 from changing direction from reverse to forward until the machine speed is below the threshold. In addition, the drivetrain controller 140 commands the brake controller 152 to apply braking torque to the travel mechanisms 104 in response to the accelerator pedal position signal to reduce the ground speed of the machine 100 (Step 172). In other words, if the machine speed is equal to the ground speed that is greater than approximately zero, the drivetrain controller 140 commands the brake controller 152 to apply the braking torque in response to the accelerator pedal position signal until the machine 100 reaches the threshold, for example, the ground speed approximately zero, or a ground speed that is the range between approximately zero and one mile per hour, as shown in FIG. 4.

As a result, the accelerator pedal 153 behaves functionally as a brake pedal, in which depressing the accelerator pedal 153 activates the braking system 125 to reduce the speed of the machine 100. In one embodiment, the drivetrain controller 140 commands the brake controller 152 to provide a magnitude of braking torque that is equal to a fixed or a constant value in response to the accelerator pedal position signal. In other words, the drivetrain controller 140 commands the brake controller 152 to apply a fixed braking torque to the travel mechanisms 104 in response to the non-zero accelerator pedal position or the full accelerator pedal position to reduce the machine speed until the machine speed is equal to the threshold.

In the illustrated embodiment, the drivetrain controller 140 commands the brake controller 152 to provide a magnitude of braking torque that is based on a multiplier, which may be predetermined, and the accelerator pedal position signal. For example, if the multiplier is equal to one, the drivetrain controller 140 commands the brake controller 152 to provide a braking torque that is proportional to the accelerator pedal position signal. That is, a twenty percent depression of the accelerator pedal 153 would correspond to a provision of braking torque equal to twenty percent of the maximum amount of braking torque.

Referring to FIG. 4, four graphs of various parameters are shown as functions of time for one embodiment of the direction change process. The top graph, I, illustrates the change in the position of the shift lever from the reverse position to the forward position. The second graph, II, illustrates the accelerator pedal position signal at the full accelerator pedal position. The third graph from the top, III, shows the machine speed in the forward and reverse driving directions. The fourth and final graph at the bottom, illustrates torque commands provided by the control system 130.

As illustrated in FIG. 4, when the magnitude of braking torque is based on the multiplier equal to one, a 100 percent depression of the accelerator pedal 153 corresponding to the full accelerator pedal position signal (graph II) would result in the provision of braking torque equal to the maximum amount of braking torque, that is, when the shift lever position is changed from the reverse position to the forward position (graph I) and the machine speed is greater than the threshold (graph III). Again, note that consideration of the machine speed relative to the threshold is based on the magnitude of the machine speed, not the direction of the machine speed. Thus, the slope of the line depicted in graph III as it represents the applied braking torque that is proportional and is corresponding to the full accelerator pedal position signal depicted in graph II is relatively steeper than the slope would be if the accelerator pedal position signal was instead the non-zero accelerator pedal position signal (not shown in graph).

It is contemplated, however, that the multiplier can be a constant or a variable (e.g. exponential or non-linear) and can be different than one, including less than one for a provision of braking torque less than the maximum amount or greater than one for a provision of braking torque that is non-linear or non-proportional. In addition, it is contemplated that in some embodiments, the drivetrain controller 140 commands the brake controller 152 to provide a magnitude of braking torque that is based on the multiplier and the accelerator pedal position signal only when the accelerator pedal position signal is relative to a threshold, for example, greater than a threshold, which may also be predetermined.

For example, if the multiplier is equal to one and the accelerator pedal position threshold is equal to thirty percent, the drivetrain controller 140 commands the brake controller 152 to provide a braking torque that is proportional to the accelerator pedal position signal only when the accelerator pedal position is greater than thirty percent. That is, a twenty percent depression of the accelerator pedal 153 would not correspond to a provision of braking torque equal to twenty percent of the maximum amount of braking torque; however, a forty percent depression of the accelerator pedal 153 would correspond to a provision of braking torque equal to forty percent of the maximum amount of braking torque.

Figure 5:
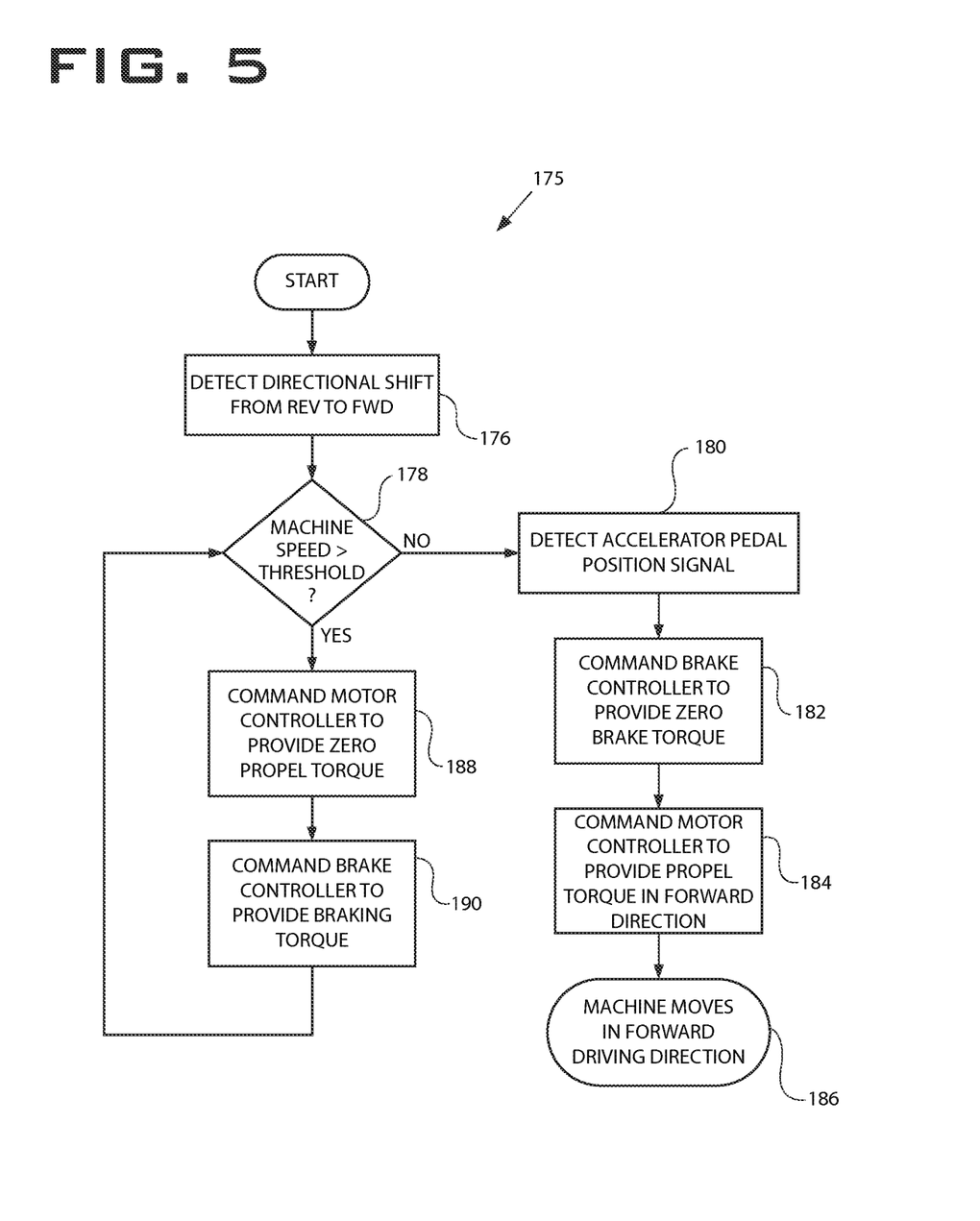
FIG. 5 is a flow chart illustrating one embodiment of the change the direction process in accordance with an exemplary embodiment of the present disclosure.

FIG. 5 illustrates a flow chart of an alternative embodiment of the change the direction process 175 that may be performed by the control system 130 and/or other components of the machine 100. Accordingly, the control system 130 may be configured to detect when the machine 100 experiences the direction shift from the reverse driving direction to the forward driving direction, similarly as discussed in detail above (Step 176). Once the drivetrain controller 140 receives the direction shift signal indicative of the shift lever position corresponding to the drive position, the control system 130 may execute a direction change software implemented program. In one embodiment, the control system 130 may determine the speed of the machine 100 through the speed sensors 133. Once the machine speed is determined, the control system 130 may compare the machine speed to a threshold (Step 178). The threshold may be predetermined and based on the electric motor parameter, exactly as discussed in detail above.

If, for example, the machine speed is equal to the ground speed that is equal to the threshold, that is, approximately zero (Step 178; NO), the drivetrain controller 140 detects a signal indicative of the accelerator position signal, that is, the non-zero or the full accelerator pedal positions (Step 180). The drivetrain controller 140 then commands the brake controller 152 to provide zero braking torque (Step 182). In addition, the drivetrain controller 140 commands the motor controllers 142, 144 to provide propel torque in response to the accelerator pedal position to the travel mechanisms 104 in the forward direction (Step 184), propelling the machine 100 in the forward driving direction (Step 186).

If, however, the drivetrain controller 140 determines that the machine speed is greater than the threshold, that is, that the machine speed is equal to the ground speed that is greater than approximately zero (Step 178; YES), the drivetrain controller 140 commands the motor controllers 142, 144 to provide zero propel torque in the forward direction (Step 188), which prevents the machine 100 from changing direction from reverse to forward until the machine speed is below the threshold. In addition, the drivetrain controller 140 commands the brake controller 152 to apply a braking torque to the travel mechanisms 104 independent of the accelerator pedal position signal to reduce the speed of the machine 100 until, for example, the ground speed reaches the threshold (Step 190).

In one embodiment, the drivetrain controller 140 commands the brake controller 152 to provide a magnitude of braking torque that is equal to a fixed or a constant value. In other words, the drivetrain controller 140 commands the brake controller 152 to apply a fixed braking torque to the travel mechanisms 104 independent of the accelerator pedal position to reduce the machine speed until the machine speed is equal to the threshold.

It will be appreciated that the foregoing description provides examples of the disclosed methods and systems. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for changing a direction of a machine is moving in a first direction, the method comprising the steps of:
   receiving a signal indicative of an intention to change the direction of the machine to a second direction;
   determining whether a signal indicative of a speed of the machine is greater than a threshold based at least in part on an electric motor parameter; and
   applying a braking torque to at least one travel mechanism of the machine in response to a signal indicative of an accelerator pedal position until the speed reaches the threshold, wherein the braking torque applied to the at least one travel mechanism is based in part on a multiplier times the accelerator pedal position signal and the accelerator pedal position signal represents a percentage change that ranges from zero to 100 percent corresponding to a depression of an accelerator pedal from zero to 100 percent.

2. A method according to claim 1, further comprising the step of:
   applying a propel torque to the at least one travel mechanism in response to the accelerator pedal position signal and the change the direction signal to move the machine in the second direction when the speed is substantially equal to the threshold.

3. A method according to claim 2, wherein the first direction is a reverse driving direction and the second direction is a forward driving direction.

4. A method according to claim 1 wherein the multiplier is substantially equal to one and the braking torque applied to the at least one travel mechanism is substantially proportional to the depression of the accelerator pedal.

5. A method according to claim 1, wherein the braking torque is applied only when the accelerator pedal position signal is greater than a second threshold based at least in part on the accelerator pedal position signal.

6. A method according to claim 2, wherein the braking torque is substantially equal to a magnitude that is applied to the at least one travel mechanism independent of the accelerator pedal position signal, and wherein applying the braking torque reduces the speed of the machine until the speed reaches the threshold.

7. A method according to claim 1, wherein the speed is at least one of a ground speed or a motor speed.

8. A method according to claim 1, wherein the braking torque is provided in part by an electric motor.

9. A method according to claim 1, wherein a first portion of the braking torque is provided by an electric drive system and a second portion of the braking torque is provided by at least one service brake.

10. A system for changing a direction of a machine that is moving in a first direction, the system comprising:
    a control system that is configured to:
      receive a signal indicative of an intention to change the direction of the machine to a second direction;
      determine whether a signal indicative of a speed of the machine is greater than a threshold based at least in part on an electric motor parameter; and
      apply a braking torque to at least one travel mechanism of the machine in response to a signal indicative of an accelerator pedal position until the speed reaches the threshold, wherein the braking torque applied to the at least one travel mechanism is based in part on a multiplier times the accelerator pedal position signal and the accelerator pedal position signal represents a percentage change that ranges from zero to 100 percent corresponding to a depression of an accelerator pedal from zero to 100 percent.

11. The system of claim 10, wherein the control system is further configured to apply a propel torque to the at least one travel mechanism in response to the accelerator pedal position signal and the change the direction signal to move the machine in the second direction when the speed is substantially equal to the threshold.

12. A system according to claim 11, wherein the first direction is a reverse driving direction and the second direction is a forward driving direction.

13. A system according to claim 10, wherein the multiplier is substantially equal to one and the braking torque applied to the at least one travel mechanism is substantially proportional to the depression of the accelerator pedal.

14. A system according to claim 10, wherein the braking torque is applied only when the accelerator pedal position signal is greater than a second threshold based at least in part on the accelerator pedal position signal.

15. A system according to claim 10, wherein the braking torque is substantially equal to a magnitude that is applied to the at least one travel mechanism independent of the accelerator pedal position signal, and wherein applying the braking torque reduces the speed of the machine until the speed reaches a threshold.

16. A system according to claim 10, wherein the braking torque is provided in part by an electric motor.

17. A system according to claim 10, wherein a first portion of the braking torque is provided by an electric drive system and a second portion of the braking torque is provided by at least one service brake.

* * * * *